Sept. 22, 1970

R. E. J. GERARD 3,530,368

STABILISERS

Filed June 12, 1967

Inventor:

Roger Edwin John Gerard

BY Baldwin Wight Diller & Brown

Attorneys

United States Patent Office 3,530,368
Patented Sept. 22, 1970

3,530,368
STABILISERS
Roger Edwin John Gerard, London, England, assignor to The Marconi Company Limited, London, England, a British company
Filed June 12, 1967, Ser. No. 645,554
Claims priority, application Great Britain, June 17, 1966, 27,146/66
Int. Cl. G05f 1/40
U.S. Cl. 323—22 9 Claims

ABSTRACT OF THE DISCLOSURE

In known stabilisers the relationship between output and input is controlled by a transistor switched by a comparator comparing the output voltage with a reference. This arrangement requires an additional transistor to amplify the current fed to the load; it has high volt-drop across the transistor when closed; low gain and slow switching. In the invention positive feedback is applied to the transistor through a transformer having three windings, one in the collector circuit, a second between base and emitter and a third through which switching pulses, from the known comparator arrangement, are applied to the transistor.

This invention relates to stabilisers and more specifically to so-called switching stabilisers, that is to say to stabilisers in which the relation between a stabilised output voltage and an input supply voltage is determined by the ratio of time closed to time open of a switch device or circuit connected between an input terminal and an output terminal. The switch device is customarily a transistor and where relatively large values of current are to be supplied by the stabiliser to the load, additional current amplification is usually necessary for the switching transistor.

In order that the invention may be the better understood there will first be described a known switching stabiliser which is capable of handling relatively large currents and is shown in simplified block diagram manner in FIG. 1 of the accompanying drawings.

Figure 1:
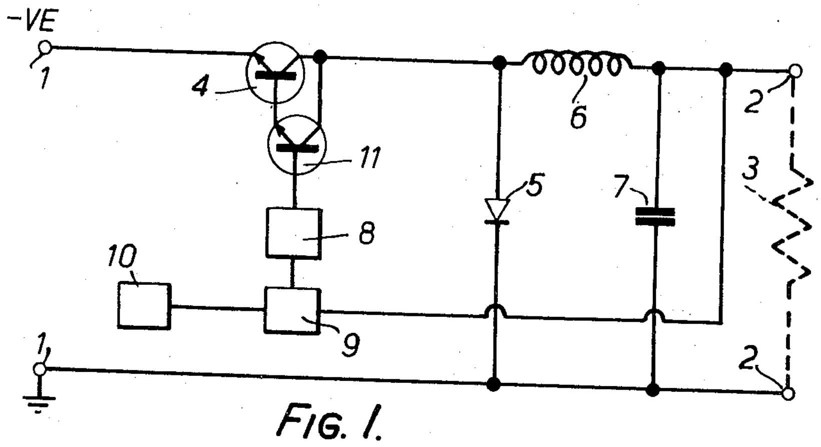

Referring to FIG. 1, input D.C. voltage to be stabilised is applied at terminals 1 and stabilised output D.C. voltage is obtained at terminals 2. In use a load (represented by the broken line resistance 3) is connected between terminals 2. In series in the "Live" line is a switch constituted by a switching transistor 4. 5 is a diode and 6 and 7 are respectively an inductance and condenser providing the usual filter. The switching transistor 4 is opened and closed by the opening and closing of the switching drive unit 8, such as a free running multi-vibrator, the mark/space ratio of which is in turn controlled by a comparator 9 which compares the output voltage with a reference voltage from a reference voltage source 10. The ratio of output voltage to input voltage is dependent upon the fraction of the total time in which the switching transistor is conductive, i.e. the switch is closed. In FIG. 1, current amplification is provided by the additional transistor 11 in order to enable a high current to be supplied to the load.

Ideally the switching transistor 4 should have zero volts drop across it when it is in the conducting condition, i.e. the volts drop across the switch, when closed, should be zero. Ideally also its rate of change from the conducting to the non-conducting state should be infinite, i.e. the switch should open in zero time. Of course, neither of these ideal desiderata is attainable but known stabilisers as shown in FIG. 1 fall undesirably short of the ideal. Moreover it is desirable that the current gain of the said switching transistor 4 shall be reasonably high.

The main defect of the known arrangement of FIG. 1 is the extent to which it falls short of the ideal requirement of zero volts drop across the switch when closed. In fact the minimum voltage drop across the switch, when closed, is, the sum of the emitter-base voltage of transistor 4 and the emitter-collector voltage of transistor 11 and, in practice, it is difficult to find transistors for use as transistors 4 and 11 which will result in a voltage drop across the switch, when closed, of less than about 2.5 volts at high load currents. In addition, moreover, the switching speed from closed to open of transistor 4 is relatively slow and the current gain of the transistor is also somewhat low. Sometimes, in an attempt to increase switching speed a low value resistance is connected between the emitter and base of transistor 4 and/or a low value resistance is provided between emitter and base of transistor 11. The expedients do produce small increase in switching speed but only at the expense of loss or gain.

According to this invention a switching stabiliser employing a transistor as the switching device thereof comprises means dependent on the current passed when said transistor is switched to the conductive condition for applying positive feedback to its base, the arrangement being such that said transistor, once switched to said condition, remains in said condition until switched to the non-conducting condition.

In a preferred embodiment the feedback is applied by means of a transformer having one winding in series in the collector circuit of the switching transistor and another connected between the base and the emitter thereof.

Preferably the transformer has a third winding through which switching pulses from the comparator of the stabiliser are applied.

Preferably also the third transformer coil is fed with pulses from a transistor in turn supplied with rectangular wave output from a multi-vibrator the mark/space ratio of which is controlled by a comparator connected to compare the stabiliser output voltage with a reference voltage.

Figure 2:
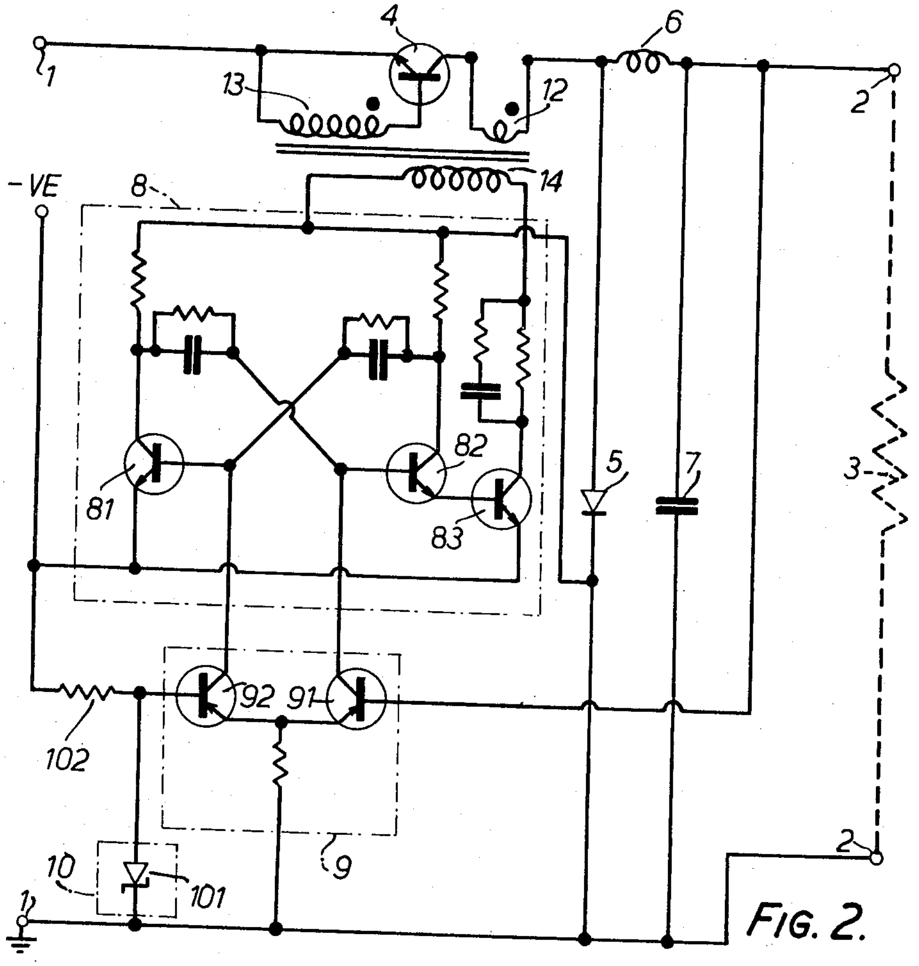

FIG. 2 of the accompanying drawings is a diagram of a preferred embodiment of the invention. Like references denote like parts in FIGS. 1 and 2.

As will be seen from FIG. 2 there is provided a current transformer having three windings which are isolated from one another as respects D.C. The winding 12 is in series in the collector circuit of transistor 4; the winding 13 is connected between the base and the emitter of said transistor 4; and the winding 14, supplies switching pulses to said transistor 4. The winding senses are indicated in conventional manner by appropriately positioned dots.

In FIG. 2 the switching drive unit 8, the comparator 9 and the reference source 10 are shown in some little detail diagrammatically within the chain line blocks referenced 8, 9 and 10 respectively. The comparator 9 comprises two transistors 91 and 92 of which the former receives on its base voltage form the "live" output terminal 2 and the latter receives on its base the reference voltage set up across a reference source shown as constituted by a Zener diode 101 which is connected through a resistance 102 to a suitable negative potential supply. If desired the reference voltage source may be arranged in any convenient suitable manner known per se to provide an adjustable reference voltage but, in order not to complicate the figure, this is not shown. The switching drive unit 8 comprises a multi-vibrator which comprises the transistors 81 and 82 and a further transistor 83. The multivibrator is a free-running multi-vibrator of form well known per se and provides a rectangular wave form having a mark/space ratio which is controlled by the comparator 9 the output collector terminals of which are, as shown, connected to the bases of the transistors 81, 82 respectively. The emitter of the transistor 82 is connected to the base of the further transistor 83 which has the coil 14 included in its collector circuit. The single transistor 83 is sufficient to enable the multi-vibrator to cause the required opening and closing of the switching transistor 4. When the trailing edge of a rectangular pulse form the multi-vibrator occurs, the transistor 83 becomes conductive and the resulting peak of voltage fed to the coil 14 causes the switching transistor 4 to cut off, i.e. it opens the switch. When the leading edge of the next pulse from the multi-vibrator occurs the transistor 83 is cut off and the switch is closed. Since the comparator 9 controls the mark/space ratio of the multi-vibrator in the drive unit 8 and is itself controlled by the relation between the output voltage and the reference voltage, the ratio of time closed to time open of the switch is controlled in the required manner.

The circuit of FIG. 2, despite its simplicity, has important advantages over known comparable switching stabilisers like that of FIG. 1. There is only the one transistor 4 in series with the load so that, in practice, the volts drop across the switch, when closed, will be only about ⅓ of that which occurs with FIG. 1 in the same high current load condition. The winding 12, which takes the full load current, provides positive feedback on the base of transistor 4 with the result that, once said transistor is switched on, it remains on until switched off so that only a small pulse of current is required to initiate the switching functions. Since the switching pulses are provided from a separate winding (14) on the transformer, the driving circuit for the switching transistor is isolated as regards D.C. Again, by suitably choosing the transformer turns ratio, the current taken by the driving circuit may be made quite low. Because of the isolation, either an NPN or a PNP transistor may be used for the switching transistor 4 with, of course, suitable polarity of supply. Because of the positive feedback the speed of switching is inherently high. Finally, because the base current of the transistor 4 is a fixed proportion (dependent on the tarnsformer turn ratio) of the load current the base current is small when theload is light whereas, in the known arrangement of FIG. 1, the base current must always be sufficient to switch the maximum load current.

I claim:

1. A switching stabiliser comprising, in combination, a transistor having its emitter-collector path connected in series between a D.C. supply source and a load, means responsive to current passed through said emitter-collector path when said transistor is switched to a conductive state for applying a positive current feedback to the base of said transistor, and means responsive to voltage across at least part of said load for selectively switching said transistor between said conductive state and a non-conductive state for controlling the relationship of the on time interval to the off time interval of the transistor whereby the voltage across said load is stabilised.

2. A stabiliser as claimed in claim 1 wherein said means responsive to current passed through said emitter-collector current path comprises a current transformer having a first winding in series with said emitter-collector path and a second winding connected in the base-emitter path of said transistor.

3. A stabiliser as claimed in claim 2 wherein said transformer has a third winding through which switching pulses may be applied to said base-emitter path, said third winding being coupled to said means responsive to voltage across at least a part of said load.

4. A stabiliser as claimed in claim 3 wherein said third winding is coupled to an output from a transistor having its input supplied with a rectangular wave output from a multivibrator the mark/space ratio of which is controlled by a comparator connected to compare said voltage across said at least part of said load with a reference voltage.

5. A stabiliser as claimed in claim 4 wherein said comparator is connected to compare voltage across said load with a reference voltage.

6. A stabiliser as claimed in claim 1 wherein said means responsive to voltage across at least part of said load comprises a comparator means for comparing the voltage across at least a part of said load with a reference voltage.

7. A stabiliser as claimed in claim 6 wherein said means responsive to voltage across at least a part of said load further comprises a multivibrator means controlled by said comparator means.

8. A stabiliser as claimed in claim 7 wherein said multivibrator means has an output coupled to means for supplying current to one winding of a transformer for supplying switching pulses thereto, said transformer having a second winding in series with said emitter-collector path of said transistor and a third winding connected in the base-emiter path of said transistor, the second and the third windings being arranged for applying said positive current feedback.

9. A stabiliser as claimed in claim 8 wherein said means for supplying current comprises a second transistor.

References Cited

UNITED STATES PATENTS

| | | | |
|---|---|---|---|
| 3,035,220 | 5/1962 | Fischer | 307—253 X |
| 3,104,329 | 9/1963 | Haas | 307—295 X |
| 3,173,027 | 3/1965 | Monin | 307—253 X |

D. D. FORRER, Primary Examiner

R. C. WOODBRIDGE, Assistant Examiner

U.S. Cl. X.R.

307—247, 253